United States Patent [19]

Gilgrass

[11] Patent Number: 4,818,582

[45] Date of Patent: Apr. 4, 1989

[54] TENSION BANDS AND METHODS FOR THEIR MANUFACTURE

[75] Inventor: Graham Gilgrass, Oxford, United Kingdom

[73] Assignee: Oxford Magnet Technology Limited, Oxford, England

[21] Appl. No.: 87,223

[22] Filed: Aug. 20, 1987

[30] Foreign Application Priority Data

Sep. 8, 1986 [GB] United Kingdom ............... 8621563

[51] Int. Cl.⁴ .............................................. B32B 3/00
[52] U.S. Cl. .................................. 428/189; 428/114; 428/284; 428/285; 428/294; 428/413; 428/417; 428/902
[58] Field of Search .................. 428/113, 114, 44, 189, 428/190, 121, 192, 285, 413, 417, 294, 284, 902

[56] References Cited

U.S. PATENT DOCUMENTS 4,696,853 9/1987 Fourezon ........................... 428/257

OTHER PUBLICATIONS

Tobler and Read "Fatigue Resistance of a Uniaxial S-Glass/Epoxy Composite at Room and Liquid Helium Temperatures", vol. 10, Jan. 1976, p. 32.
Morris "Filament Wound Composite Thermal Isolator Structures for Cryogenic Dewars and Instruments" ASTM SDP768 N.R.A. Adsit, Ed, American Society for Testing Materials 1982, pp. 95–109.

Primary Examiner—James J. Bell
Attorney, Agent, or Firm—Staas & Halsey

[57] ABSTRACT

A tension band comprises a number of layers of resin bonded fibre rovings, the rovings in each layer being laterally offset from the rovings in adjacent layers. Methods and apparatus for manufacturing such tension bands are also described.

17 Claims, 4 Drawing Sheets

TENSION BANDS AND METHODS FOR THEIR MANUFACTURE

BACKGROUND OF THE INVENTION

1. Field of the Invention

The invention relates to tension bands and methods and apparatus for manufacturing such tension bands. The invention is concerned in particular with tension bands for use as supports in cryogenic applications.

2. Description of the Related Art

Superconducting magnets are commonly used in magnetic resonance imaging (MRI) systems and are essentially solenoids which are cooled to operational temperatures in a bath of liquid helium provided in a cryostat. Liquid helium boils at a temperature of 4.2 K. and to maintain this helium bath it is necessary to design a cryostat that reduces to a minimum the transfer of heat from the environment. Three methods of heat transfer are usually considered: conduction plus convection through gas (air) between the helium vessel and its environment, radiation from the environment onto the helium vessel, and conduction through the physical support structure of the helium vessel.

To deal with the problems of heat transfer, cryostats built to contain imaging magnets are built with a series of radiation shields between the surface of the outer vessel and the helium vessel. In some configurations of imaging cryostats the intermediate shields are cooled by refrigerators that use external power. Others use as an intermediate shield a vessel which contains liquid nitrogen which boils at 77 K. at normal atmospheric pressure. In this case, the shield is maintained at an intermediate temperature by the boiling nitrogen and energy from the environment is absorbed by the latent heat of boiling.

It is necessary to design a support system for the elements of the cryostat which is strong enough to support the vessels and shields and which does not allow heat to be conducted directly from the outer vessel to the helium can. The forces which the elements of the cryostat undergo include gravity, acceleration during movement of the cryostat, and magnetic interactions with the structural iron.

Conventionally, a system of struts operating in three dimensions and supporting the vessels while acting in tension has been used for NMR imaging magnet cryostats. Examples of these struts are described in USSN 912,246. Unique combinations of strength and thermal isolation are required for NMR magnets.

The weight of the imaging magnet and vessel range from 1500 to 4000 kilograms dependent upon magnet field strength and vessel configuration.

Until recently, support systems were designed solely to deal with gravitational forces. Relatively recently, it has become an operational requirement that imaging magnets are built into mobile scanners housed in custom built bodies on air ride trucks. The vibration and impact accelerations experienced by the magnet can occur in any of three dimensions.

These requirements have resulted in the need for a support member capable of withstanding a sustained fatigue loading of 15 to 30 KN, with an ultimate tensile strength of greater than 75 KN. This represents 2 g fatigue and 5 g shock loading, for the heaviest magnet considered, when distributed across 4 suspension members.

A paper entitled "Fatigue Resistance of a Uniaxial S-Glass/Epoxy Composite at Room and Liquid Helium Temperatures" by Tobler and Read in J. Composite Materials, Vol. 10 (January 1976), p.32 and a paper entitled "Filament Wound Composite Thermal Isolator Structures for Cryogenic Dewars and Instruments" by Morris in Composites for Extreme Environments, ASTM SDP768 N.R.A. Adsit, Ed, American Society for Testing Materials 1982, p. 95–109 describe composite materials for manufacturing tension bands which have been proposed in the past for satisfying the above requirements. These papers describe a variety of uses for such tension bands including their use as thermal isolator straps for cyogenic dewars and instruments.

Although these tension bands have a good thermal/tensile strength, they have to be produced individually at very high cost if they are to have sufficient strength for use in heavy duty applications such as cryostats for NMR imaging magnets.

SUMMARY OF THE INVENTION

In accordance with one aspect of the present invention, a tension band comprises a plurality of layers of resin bonded fibre rovings, the rovings of the plurality of layers extending in the same direction, and the rovings in each layer being laterally offset from the rovings in adjacent layers in a direction transverse the direction in which the rovings extend.

In the invention, the rovings in each layer are laterally offset in a regular manner from the rovings in adjacent layers by a predetermined amount preferably the degree of overlap is substantially 50%. This has resulted in a significant increase in tensile strength compared with known tension bands of similar dimensions. This means that it is possible to achieve a high tensile and fatigue strength tension band while minimizing the cross-sectional width of the band and thus minimizing the conducted heat load within a cryostat or other cryogenic environment in which the band is used. In addition, this new tension band is particularly suited to mass production at a much lower cost than previously.

In this context, a "roving" is defined as comprising a bundle of individual fibres and will typically have a rectangular cross-section.

The rovings may be woven or, preferably, non-woven (i.e., unidirectional).

The resin is preferably an epoxy resin.

Although the rovings in each layer may be of the same material, it is preferred to include one or more partial layers of rovings of a different material from the remainder of the layers. These additional partial layers may be in the form of pre-impregnated fibre sheets of unidirectional fibres.

The use of these additional layers is particularly advantageous when the tension band is in the form of an elongated, endless loop, in which case the inserts are provided at each end of the loop. The advantage of this is that any failure in the tension band will occur within the length of the band rather than at one of the ends which results in an increase in fatigue strength.

The concept of additional layers may be applied to conventional tension bands so that, in accordance with a second aspect of the present invention, a tension band comprises a plurality of layers of first resin bonded fibre rovings, and a plurality of additional, partial layers of second resin bonded fibre rovings interleaved between the layers of first fibre rovings.

The first and second fibre rovings may be the same or different materials. The second fibre rovings are preferably unidirectional.

The fibres preferably comprise glass fibres such as S-glass fibres, although other fibres such as carbon fibres or Kevlar fibres could be used.

The advantage of these new tension bands over conventional tension rods which have previously been used can be seen by comparing the cross-sectional area of a tension band with the cross-sectional area of a tension rod providing the same tensile strength. Thus, a tension band having a cross-section of about 60 mm$^2$ is equivalent to a tension rod of the type described in U.S. Ser. No. 912,246 having a cross-section of about 78 mm$^2$. This reduction in cross-section leads to a reduction in the heat conduction capability of the band which is very important when the band is used in a cryogenic application and in the cost of the band.

In accordance with a third aspect of the present invention, a method of manufacturing a tension band comprises laying down on a mandrel a number of layers of resin impregnated fibre rovings, the rovings in each layer being laid down so that they are laterally offset from the rovings in adjacent layers; and curing the fibre rovings.

Preferably, during the laying down step, one or more fibre sheets are periodically laid down on the most recently laid layer. These sheets may be made from the same or different fibres from the other layers.

The third aspect of the invention is particularly suitable for manufacturing a number of tension bands in which a composite, uncured structure is manufactured by laying down on a mandrel a number of layers of resin impregnated fibre rovings, the rovings in each layer being laid down laterally offset from the rovings in adjacent layers; curing the composite structure; and cutting the cured composite structure into two or more tension bands.

Preferably, the laid down, uncured rovings are compacted prior to curing.

In accordance with a fourth aspect of the present invention, an apparatus for manufacturing an uncured structure which after curing comprises a tension band includes a first support to which is rotatably mounted a mandrel; a second support for a resin bondable fibre roving store; indexing means to which rovings from the store are fed, the indexing means and the mandrel being relatively movable, whereby in use layers of rovings are laid down on the mandrel, the rovings in each layer being laterally offset from the rovings in adjacent layers; and drive means for causing relative movement between the indexing means and the mandrel.

Preferably, the apparatus further comprises a resin bath through which the rovings pass prior to being laid down on the mandrel. Alternatively, the rovings could be pre-impregnated with resin before being positioned in the store or impregnated after laying down on the mandrel.

BRIEF DESCRIPTION OF THE DRAWINGS

Some examples of tension bands and apparatus for manufacturing the tension band in accordance with the present invention will now be described with reference to the accompanying drawings, in which.

DETAILED DESCRIPTION OF THE PREFERRED EMBODIMENTS

Figures 1, 2:
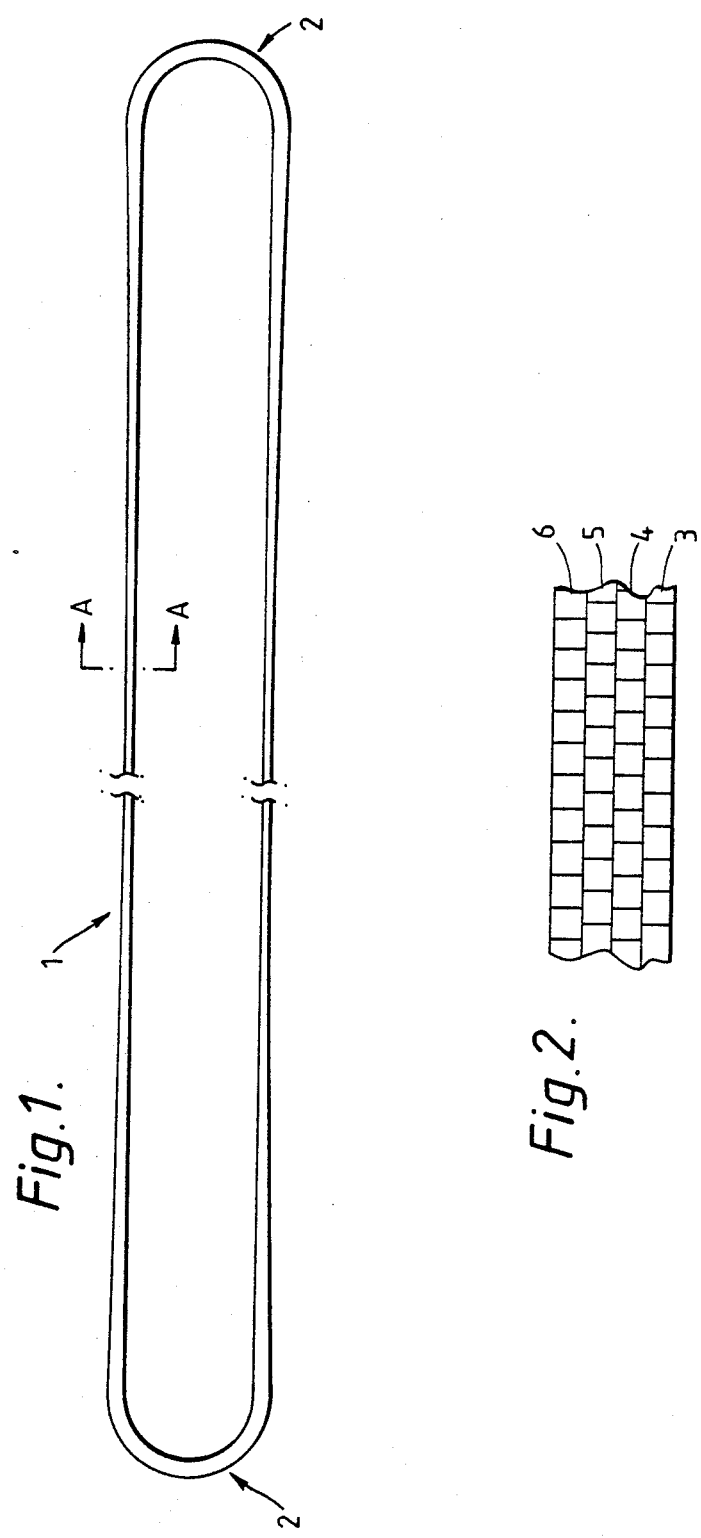
FIG. 1 is a side view of one example of a tension band.
FIG. 2 is an enlarged, partial section taken on the line A—A in FIG. 1.

The tension band shown in FIGS. 1 and 2 has an elongate portion 1 with a length of about 350 mm and a pair of semi-circular end portions 2 with inner radii of about 12.5 mm and outer radii of about 15.3 mm. The band is built up from a number of first layers of rovings of glass fibre, four of the layers 3–6 being shown in FIG. 2. The rovings shown in FIG. 2 are formed by bundles of S-glass fibres impregnated with an epoxy resin. As can be seen in FIG. 2, the rovings in each layer 3–6 are laterally offset from the rovings in the adjacent layers. In practice, the rovings in one layer are offset by about 50% from the rovings in each adjacent layer. This regular offset, which is applied throughout the thickness of the band, leads to a high tensile strength band being produced.

It will be seen in FIG. 1 that the ends of the elongate section 1 taper outwardly towards the semi-circular portions 2. This is due to the interleaving of additional short second layers of unidirectional R glass pre-impregnated rovings in sheets at each end during manufacture of the band. These additional partial layers may be laid between each of the main layers extending throughout the length of the tension band (such as layers 3–6) or between only some of these layers.

Preferably, each interleaved, partial layer is shorter than a radially inner interleaved, partial layer. This leads to a smooth taper without high stress positions and a strong band.

The purpose of the interleaved layers is to move the region of failure from the end portions 2 to the elongate portion 1.

An example of a typical laminate is given in the following Table with the innermost layers listed first.

TABLE

| No of Layers | Fibre Type | Length (mm) |
|---|---|---|
| 2 | S Glass | |
| 1 | R Glass | 200 |
| 2 | S Glass | |
| 1 | R Glass | 171 |
| 2 | S Glass | |
| 1 | R Glass | 142 |
| 2 | S Glass | |
| 1 | R Glass | 112 |
| 2 | S Glass | |
| 1 | R Glass | 83 |
| 3 | S Glass | |

The S glass layers extend fully around the tension band.

Figure 3:
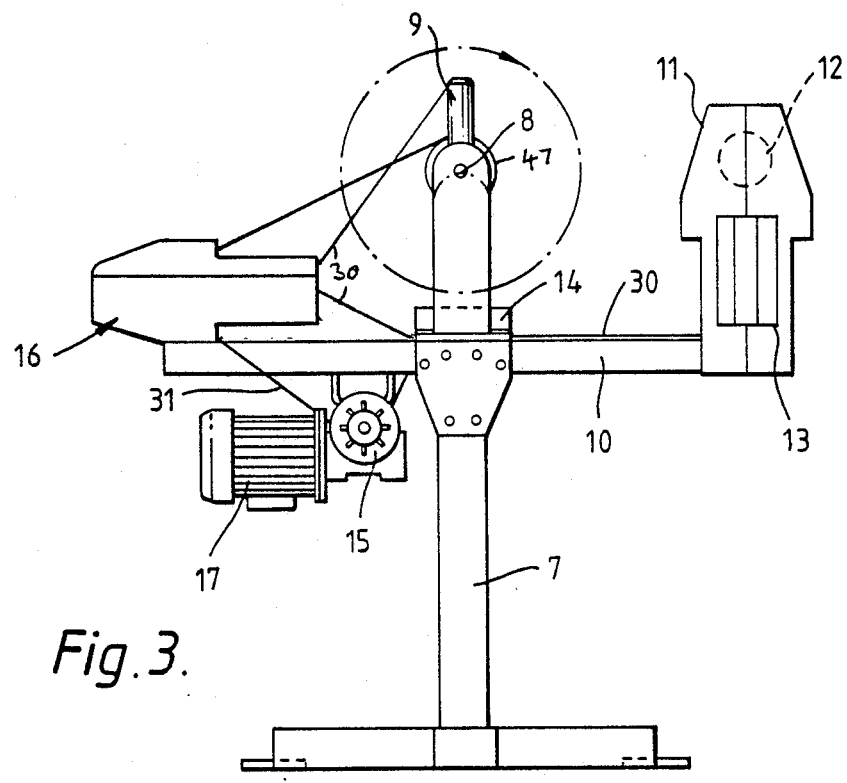
FIG. 3 is a schematic, side view of an apparatus for manufacturing the tension band.
Figure 4:
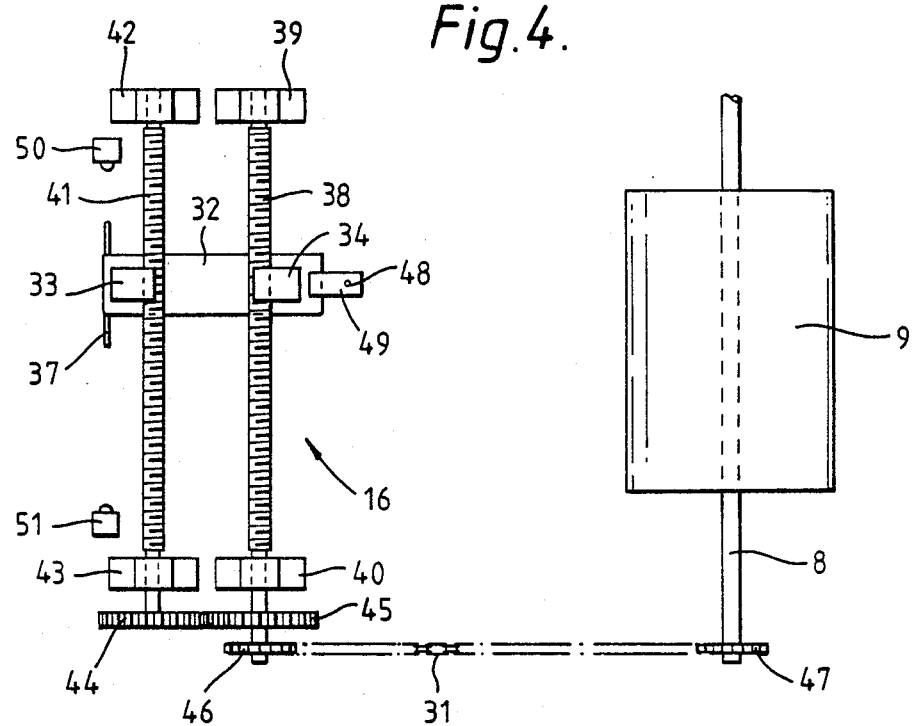
FIG. 4 is a schematic, partial plan of the apparatus shown in FIG. 3.
Figure 5:
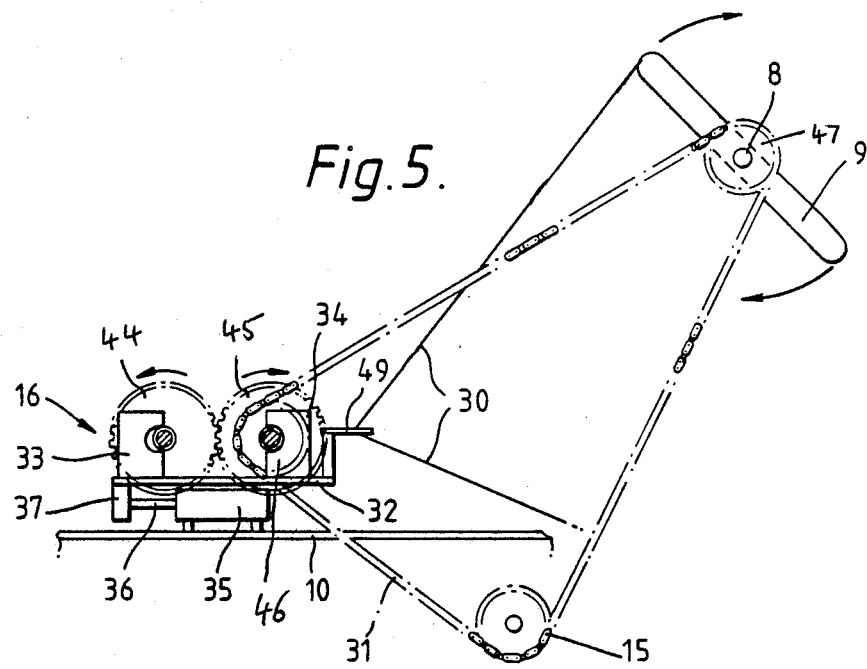
FIG. 5 illustrates schematically the indexing components of the apparatus.

FIGS. 3 to 5 illustrate an example of an apparatus for manufacturing the tension band shown in FIGS. 1 and 2. The apparatus comprises a support structure 7 on which is rotatably mounted a spindle 8 carrying a platen or mandrel 9. The support structure 7 also supports a platform 10 on which is mounted at one end a store support 11. Rotatably mounted in the store support 11 is a cylinder 12 around which is wound a length of S glass fibre rovings. Below the store support 11 is positioned a heater control 13 to control a heater (now shown) in a resin bath 14 through which the rovings pass after being unwound from the store 12. As the rovings 30 pass through the resin bath 14 they are impregnated with epoxy resin. They then pass to an indexing unit 16. The roving passes from the indexing unit 16 to the mandrel 9 onto which it is wound.

Movement of the indexing unit 16 is controlled by a drive motor 17 via a drive chain 31 and drive gear 15. The drive motor 17 also causes rotation of the mandrel 9. In addition, a tensioning element (not shown) is provided to tension the roving drawn off the store 12.

The indexing unit 16 comprises a platform 32 on which are mounted a pair of half nuts 33, 34. The platform 32 can take up one of two lateral positions under the control of a pneumatic actuator 35 having an actuating element 36 which engages a depending flange 37 mounted underneath the platform 32. In the position shown in FIGS. 4 and 5, the half-nut 34 engages the thread of a lead screw 38 rotatably mounted between bearings 39, 40 supported in side walls (not shown) of the apparatus. In the other position of the platform 32, in which the platform is moved to the right, as seen in FIG. 4, the half-nut 33 engages the thread of a lead screw 41 rotatably mounted between bearings 42, 43 also mounted to the side walls of the apparatus. Gears 44, 45 are non-rotatably mounted to the lead screws 41, 38, respectively, axially outwardly of the bearings 43, 40 while a further drive gear 46 is non-rotatably mounted to the lead screw 38. The drive chain 31 is entrained around the drive gear 46.

The drive chain 31 is also entrained around a gear 47 non-rotatably mounted to the shaft 8 on which the spindle 9 is mounted. Thus, the drive motor 17 causes rotation of the lead screws 38, 41 and the spindle 8.

The half-nuts 33, 34 are relatively off-set in the axial direction of the lead screws 38, 41 by one half pitch of the lead screw threads which are the same. The reason for this will be described in more detail below.

The roving 30 passes from the resin bath 14 through an aperture 48 in a plate 49 mounted to the platform 32 before extending to the mandrel 9.

A pair of detectors 50, 51, such as proximity switches are mounted in alignment with the flange 37 and on opposite sides of the platform 32 so that as the platform 32 approaches each end of its traverse, the corresponding proximity switch will be actuated and a control circuit (not shown) will cause the pneumatic actuator to move the platform 32 from its current position to its other position.

In operation, the glass fibre roving 30 is withdrawn from the store 12 by actuating the drive motor 17 and is drawn along the path shown in FIG. 3 onto the mandrel 9 as the mandrel is rotated. During this rotation, the indexing unit 16 moves parallel with the mandrel 9 due to the engagement of one of the half nuts 33, 34 with the corresponding lead screw 41, 38 so that a layer of rovings, such as the layer 3 in FIG. 2, is built up. Once the indexing unit 16 reaches the end of its path, the corresponding proximity switch 50,51 is actuated causing the control cicruit, such as flip-flop, to actuate the penumatic actuator 35. This will cause the other half-nut 33, 34 to engage its lead screws 38, 41. The lead screws 38, 41 rotate in opposite directions due to the gears 44, 45 so that the platform 32 will start to return to its initial position. Since the half-nuts 33, 34 are offset by half a thread pitch, the first roving of the next layer will overlap by equal amounts the last two rovings of the preceding layer. Thereafter, the indexing unit 16 moves at the original speed so that the next layer is fully laid down. This is repeated as necessary with the rovings of each layer overlapping the rovings of the preceding layer. At intervals, the drive motor 17 is stopped and fibre sheets of a different material are manually laid onto the mandrel 9 at its ends, corresponding to the curved portions 2 of the tension band. Typically, these sheets will be made from R glass fibres.

Figure 6:
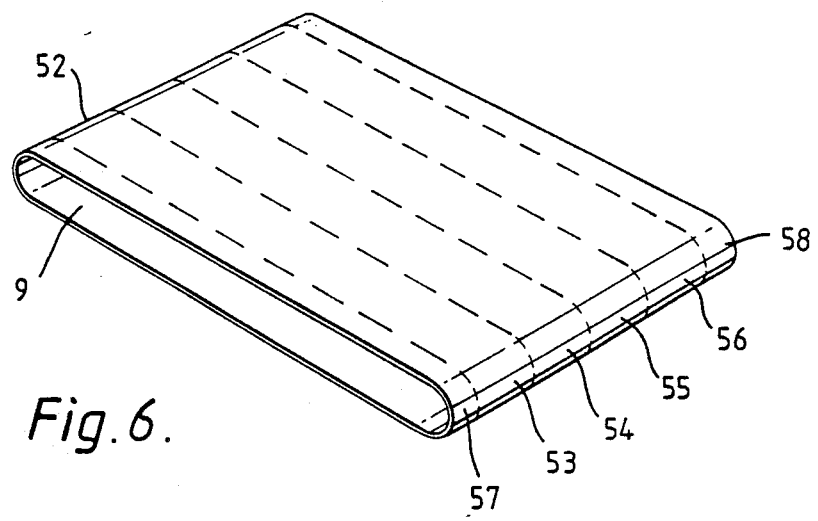
FIG. 6 illustrates a cured composite structure.

After winding, the mandrel 9 is dismounted from the support 7 and positioned between a pair of compacting plates (not shown) which squeeze the laminated rovings to a pre-determined thickness to generate a composite laminate 52 (FIG. 6). The compacted, composite laminate is then cured in a conventional manner and finally split in the elongate direction into a number of tension bands 53–56. Typically, a composite laminate is formed having a width of 200 mm and this is divided into 10 tension bands, each having a width of 20 mm. The endmost bands 57, 58 are usually discarded since these may have an over supply of resin.

Figure 7:
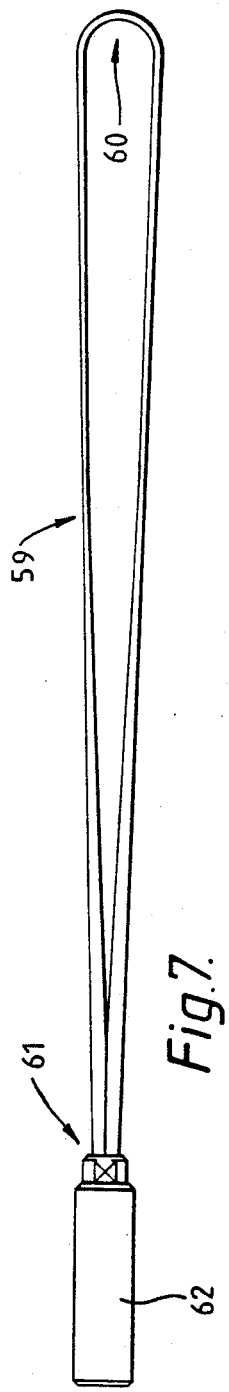
FIG. 7 is a side view of a second example of a tension band.

FIG. 7 illustrates an alternative form of tension band 59 which is constructed at one end 60 in a similar manner to the example shown in FIG. 1 but at its other end 61 the arms of the band are drawn together and cured inside a metal ferrule 62 which is externally screw threaded. The rovings are secured in the ferrule 62 using the method described in U.S. Ser. No. 912,246, the disclosure of which is incorporated herein by reference. This allows the tension band to be connected at the end 61 in a manner similar to a conventional tension rod.

Figure 8:
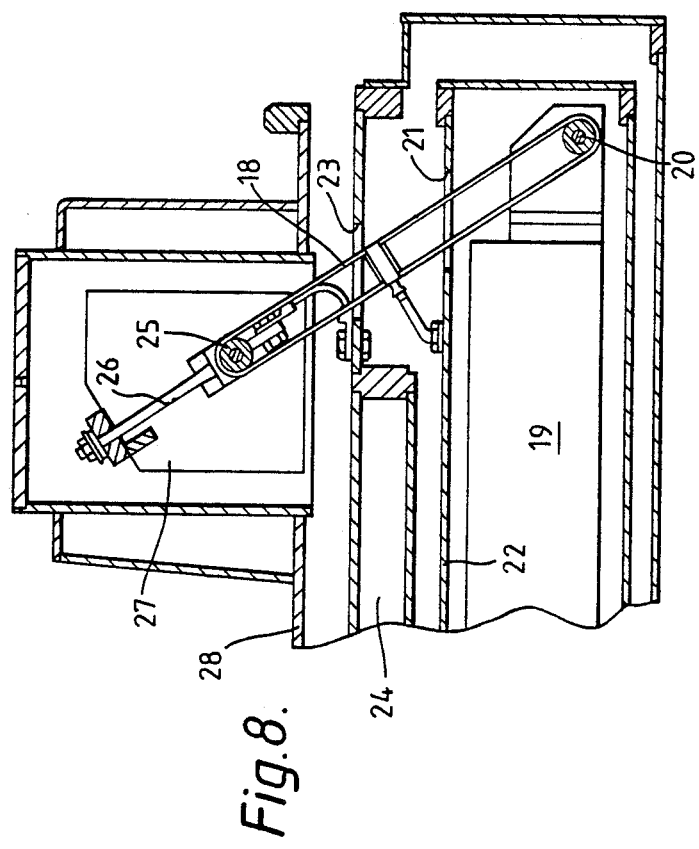
FIG. 8 illustrates a tension band supporting a liquid helium vessel of a cryostat.

FIG. 8 illustrates an example of the use of a tension band as illustrated at 18. FIG. 8 illustrates part of a cryostat having a liquid helium vessel 19 including a rod 20 around which the band 18 is mounted. The band 18 extends through an aperture 21 in a radiation shield 22 and through an aperture 23 of part of a liquid nitrogen vessel 24. The other end of the tension band 18 is mounted about a rod 25 supported in a titanium alloy clevis 26 anchored to a bracket 27 mounted within part of a vacuum chamber 28.

I claim:

1. A tension band comprising a plurality of layers of resin bonded fibre rovings, the rovings of the plurality of layers extending in the same direction and being substantially parallel to each other, and the rovings in each said layer being laterally offset from the rovings in adjacent layers in a direction transverse the direction in which the rovings extend.

2. A band according to claim 1, wherein said rovings in each said layer overlap substantially 50% of the rovings in said adjacent layers.

3. A band according to claim 1, further comprising at least one partial layer of rovings of a different material from the remainder of said layers.

4. A band according to claim 3, wherein said band is an elongated, endless loop having two ends, said partial layers being provided at each end of said loop.

5. A band according to claim 1, wherein said resin comprises epoxy resin.

6. A band according to claim 1, wherein said rovings are non-woven.

7. A band according to claim 1, wherein each roving is substantially rectangular in cross-section, and wherein said rovings in each said layer overlap substantially fifty percent of the rovings in each said adjacent layers, each roving of one layer overlying about fifty percent of each of two adjacent rovings of an adjacent layer.

8. A band according to claim 7, wherein said band is an elongated, endless loop having two ends which are reinforced by layers being at each end of said loop.

9. A band according to claim 8, wherein said resin comprises epoxy resin.

10. A band according to claim 8, wherein said rovings are non-woven.

11. An endless loop tension band having two ends, the band comprising a plurality of layers of first resin bonded fibre rovings, and a plurality of additional, partial layers of second resin bonded fibre rovings interleaved between said layers of said first fibre rovings at the two ends of the band.

12. A band according to claim 11, wherein said partial layers of rovings are made of a different material from the other layers of rovings.

13. A band according to claim 11, wherein said rovings are non-woven.

14. A band according to claim 11, wherein each of said rovings is rectangular in cross-section, each roving of one layer overlying about fifty percent of each of two adjacent rovings of an adjacent layer.

15. A tension band according to claim 14, wherein the first resin bonded fibre rovings extend in the same direction and are substantially parallel to each other, the rovings in each said layer being laterally offset from the rovings in adjacent layers in a direction transverse the direction in which the rovings extend.

16. A band according to claim 15, wherein said partial layers of rovings are made of a different material from the other layers of rovings.

17. A band according to claim 15, wherein said rovings are non-woven.

* * * * *